United States Patent
Lagerberg

(10) Patent No.: US 6,708,590 B2
(45) Date of Patent: Mar. 23, 2004

(54) MACHINE FOR CHIP CUTTING MACHINING PLUS CUTTING TOOL FOR SUCH MACHINES

(75) Inventor: Stig Lagerberg, Sandviken (SE)

(73) Assignee: Sandvik Aktiebolag, Sandviken (SE)

( * ) Notice: Subject to any disclaimer, the term of this patent is extended or adjusted under 35 U.S.C. 154(b) by 0 days.

(21) Appl. No.: 10/084,915

(22) Filed: Mar. 1, 2002

(65) Prior Publication Data
US 2002/0127067 A1 Sep. 12, 2002

Related U.S. Application Data

(63) Continuation-in-part of application No. PCT/SE00/01202, filed on Aug. 6, 2000.

(30) Foreign Application Priority Data
Sep. 2, 1999 (SE) ................................................ 9003100

(51) Int. Cl.$^7$ ............................. B23B 27/10; B23P 15/30
(52) U.S. Cl. ............................ 82/50; 407/100; 407/116
(58) Field of Search ........................ 407/116, 5; 82/50, 82/52

(56) References Cited

U.S. PATENT DOCUMENTS

| | | | |
|---|---|---|---|
| 5,388,487 A | | 2/1995 | Danielsen |
| 5,718,156 A | | 2/1998 | Lagrolet et al. |
| 5,901,623 A | * | 5/1999 | Hong ............................. 82/50 |
| 6,302,004 B1 | * | 10/2001 | Taylor ......................... 82/1.11 |
| 6,312,199 B1 | | 11/2001 | Sjödén deceased et al. |
| 6,443,672 B1 | * | 9/2002 | Lagerberg .................... 407/11 |

FOREIGN PATENT DOCUMENTS

| | | |
|---|---|---|
| WO | WO 98/48963 | 11/1998 |
| WO | WO 99/39852 | 8/1999 |

* cited by examiner

*Primary Examiner*—Willmon Fridie, Jr.
(74) *Attorney, Agent, or Firm*—Burns, Doane, Swecker & Mathis, LLP

(57) ABSTRACT

A cutting tool (2) includes a front part (5), which has a cutting insert (6), as well as a rear part (7), which is detachably mountable in a holder (3) in an appurtenant machine. The tool (2) comprises a plurality of nozzles (13), which have the purpose of spraying jets (4) of high pressure cooling liquid towards the cutting insert (6). Supply of cooling liquid to these nozzles is guaranteed via a duct system positioned inside the tool, which system includes an equally large number of mutually spaced-apart ducts as the number of nozzles, the nozzles being adjusted in order to direct the jets thereof towards different points of impact on one and the same cutting insert. In this connection, it is possible to close the individual ducts inside the tool individually in order to enable spraying of only one jet at a time towards the appurtenant point of impact on the cutting insert.

5 Claims, 3 Drawing Sheets

MACHINE FOR CHIP CUTTING MACHINING PLUS CUTTING TOOL FOR SUCH MACHINES

This Application is a CIP of PCT/SE00/01202 filed Aug. 6, 2000.

TECHNICAL FIELD OF THE INVENTION

In a first aspect, this invention relates to a machine intended for chip cutting machining, in particular metalworking, of the type that comprises one or more cutting tools with a front part, which has at least one cutting insert, as well as a rear part, which is detachably fixed in a permanent holder in the machine, the tool including a plurality of nozzles, which have the purpose of spraying jets of high pressure cooling liquid towards the cutting insert and which are supplied with pressurised cooling liquid from at least one liquid supply source, more precisely via a system of ducts inside the tool.

GENERAL BACKGROUND OF THE INVENTION AND PRIOR ART

The practice of cooling not only the cutting inserts of a cutting tool, e.g. tools for turning, but also the workpiece commonly consisting of metal which is machined by the tool has been known for a long time. A primary aim of today's technology for cutting or chip cutting machining is to enable use of as high a pressure as possible for the cooling liquid and to supply this in the form of one or more fine jets tightly focussed together, in the main directed towards the cutting insert and the chip released thereof. The higher the pressure which may be used in the liquid jet, the greater are the possibilities to use the liquid jet, in an advantageous way, not only for pure cooling, but also to mechanically effect the chip released from the work piece (by applying a force from the jet on the chip) more precisely with the purpose of breaking up the chip into smaller pieces and/or guiding the chip away from the tool in a controlled manner. Among those skilled in the art, there are different opinions about what in this connection is to be regarded as low and high liquid pressure, respectively. Generally, the classification could, however, be made in the following intervals:

Low pressure<10 bar,

Intermediate pressure 10–100 bar, and

High pressure>100 bar

The present invention relates essentially to high pressure liquid cooling technology, more precisely to the usage of a plurality of nozzles in the individual cutting tool.

A cutting tool for machines of the type mentioned initially has been disclosed previously in WO 99/39852. In this case, the tool includes a plurality of nozzles, one of which consists of a low pressure liquid nozzle, while a set of two or more nozzles consists of high pressure liquid nozzles. The low pressure liquid nozzle is supplied with cooling liquid from a separate liquid supply source in the machine, more precisely via a duct which extends through the tool, as well as through a clamping unit co-operating with the tool, which is fixedly mounted in the machine and which serves as a holder in which the tool may be detachably mounted. The high pressure liquid nozzles communicate with another liquid supply source via another, separate duct which extends through the clamping unit and the tool, more precisely up to a cavity common for all high pressure liquid nozzles inside the tool. In practice, this cavity is formed at the rear side of a detachable plate in which the high pressure liquid nozzles are mounted. The fact that the duct for the supply of high pressure cooling liquid to the high pressure liquid nozzles exhausts into a space common for these nozzles means, in practice, that all high pressure liquid nozzles are activated when the cooling liquid is supplied to the common space. In other words, all high pressure liquid nozzles will, simultaneously, spray out towards the cutting insert a number of jets corresponding to the number of nozzles. These jets may be given different points of impact on the cutting insert thanks to the fact that the nozzles are adjustable in different positions.

Development work performed recently, which is the basis for the present invention, has shown that the direction of the individual high pressure liquid jets in relation to the edge of the cutting insert is of importance not only for the cooling effect, but above all for the possibilities to break up and/or guide the released chip in an optimal way. More precisely, it has been established that optimal results in respect of cooling and chip guiding, respectively, are obtained if the high pressure liquid jet is directed perpendicularly to the edge (on quadrangular cutting inserts to each straight edge and on round cutting inserts 90° to the tangent at arbitrary points along the endless edge). From the right angle, the cooling and chip guiding effects decrease more and more the more acute the jet angle is, to a point when the angle approaches zero. However, when this insight into the importance of the jet angle is to be put into practice, a phenomenon which is difficult to master presents itself, viz. the fact that the operative part of a cutting insert may "migrate" during a machining operation. Thus, during copy turning, for instance, initially one and then the other edge on a quadrangular cutting insert may be active when the cutting insert follows a path of movement with varying depths of cut in the workpiece. With round cutting inserts having an endless edge, a limited, active portion of the edge is transported backwards and forwards along the edge depending on the pattern of movement of the cutting insert during the machining operation.

Although the high pressure liquid nozzles which are included in the cutting tool known from WO 99/39852 are adjustable in different positions in order to direct the high pressure liquid jets to different points of impact on a cutting insert, this tool is not suitable for mastering the above-mentioned migration phenomenon. During operation, the nozzles are thus adjusted in given, fixed positions, the jets being sprayed out simultaneously from all nozzles. If the individual nozzles were to be adjusted with the purpose of attaining the largest possible angle relative to the edge, i.e. an angle as close to 90° as possible, there is an obvious risk that the jets would intersect each other. This is something that would imply that tightly concentrated and focussed jets would not reach the cutting edge, but rather collide in a cascade before that. On the other hand, if the nozzles were to be installed in such a way that the risk of collision was obviated, the angle between the individual jet and the cutting edge would necessarily become less.

OBJECTS AND FEATURES OF THE INVENTION

The present invention aims at solving the above-mentioned problems and at providing an improved machine as well as an improved cutting tool for machines of the kind in question. Therefore, a primary object of the invention is to provide a cutting tool by means of which high pressure cooling liquid jets may be directed at one or more cutting edges on one and the same cutting insert while achieving a jet angle, which for each given geometry is optimally independent of which edge portion that is active during a machining operation. Another object is to create a cutting tool on which the greatest possible cooling and chip breaking effect, respectively, may be attained while at the same time reducing the cooling liquid consumption to a minimum. It is also an object to provide a structurally simple cutting tool, which may be adjusted in a reliable way in respect to the spraying of the cooling liquid during operation.

According to the invention, at least the primary object of the cutting tool is attained by the features defined in the characterizing clause of claim 4. A preferred embodiment of the cutting tool according to the invention is furthermore defined in the dependent claim 5.

In addition to the cutting tool as such, the invention also relates to a machine, intended for chip cutting machining, of the type that may include one or more cutting tools of the kind in question. Features of the machine according to the invention are seen in the characterizing clause of claim 1. Preferred embodiments of the machine according to the invention are furthermore defined in the dependent claims 2 and 3.

As regards the two categories of claims which have been made, it should be pointed out that separate cutting tools for machines for chip cutting machining are commonly manufactured and distributed by certain manufacturers, while the machines as such, i.e. excluding the cutting tools, are manufactured and distributed by other manufacturers, who purchase the tools from the first-mentioned manufacturers and mount the tools in the machines in connection with final delivery. However, in exceptional cases, it may also occur that one and the same manufacturer manufactures the machines as well as the cutting tools included therein.

Further Elucidation of Prior Art

It has been known previously per se to form such tools which comprise two or more spaced-apart cutting inserts, with a number of cutting inserts corresponding to the number of nozzles, which are supplied with cooling liquid via separate ducts and which may be activated one at a time by the fact that all ducts except one are shut. However in this case, the individual nozzle is adjusted to direct the liquid jet towards one single, given point on the co-operating cutting insert.

DETAILED DESCRIPTION OF PREFERRED EMBODIMENTS OF THE INVENTION

Figure 1:
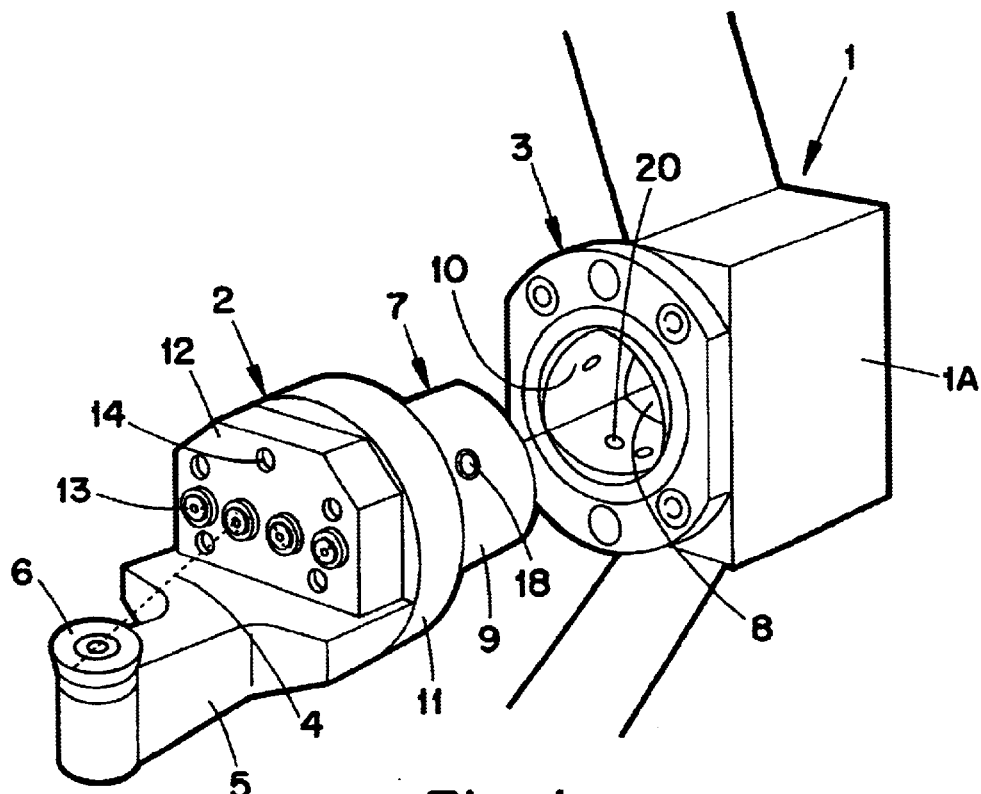
FIG. 1 is a partial, perspective exploded view showing parts of a machine plus a cutting tool according to the prior art.
Figure 7:
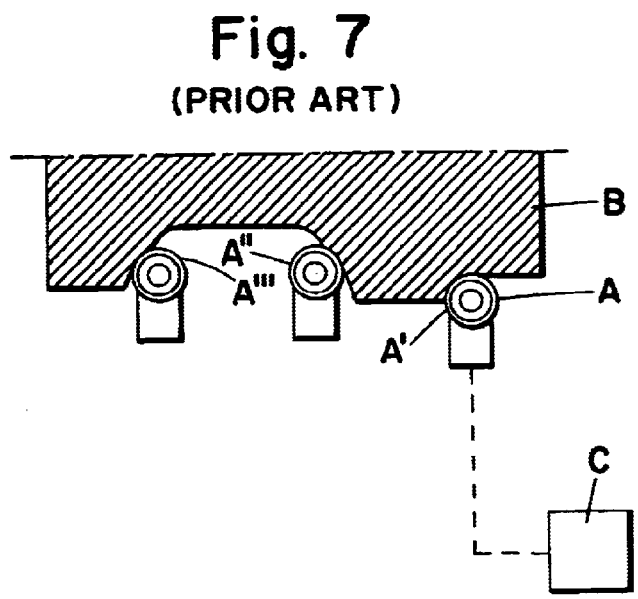
FIG. 7 is a schematic view of a prior art machining operation employing a round insert.
Figure 2:
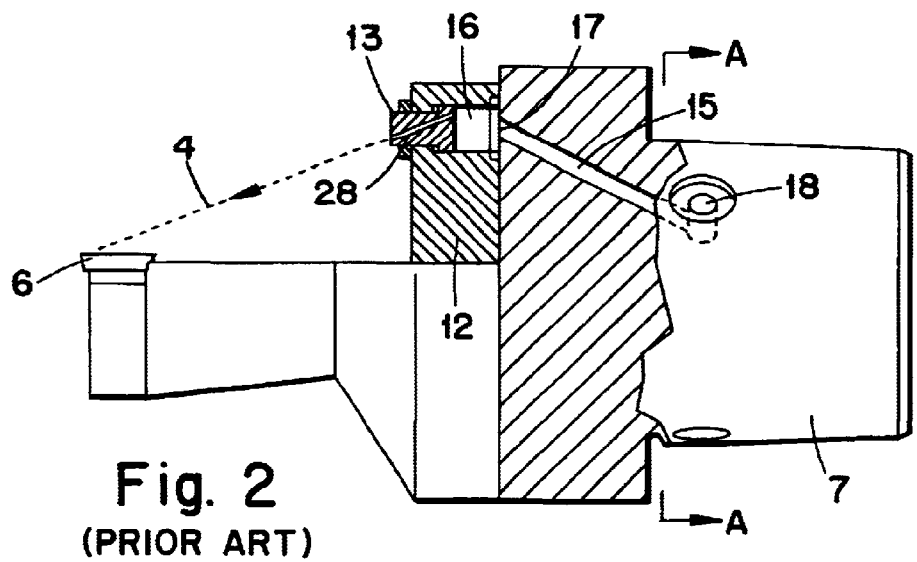
FIG. 2 is a partially cut side view showing a conventional cutting unit included in the tool.

In FIG. 1, a machine intended for chip cutting machining is generally outlined at the reference designation 1. More precisely, the machine is illustrated in the form of a portion of a rotatable turret plate, which in practice includes a plurality of different tools. One such tool is generally designated 2 and is in the form of a so called cutting unit, which co-operates with a holder in the form of a clamping unit 3. The cutting unit 2 may be detachably clamped in a fixed position in the clamping unit 3. The cutting unit 2 includes a front part 5 with a detachable cutting insert 6, which in the embodiment according to FIGS. 1–2 is exemplified in the form of a round cutting insert. A rear part 7 of the cutting unit 2 is in the shape of a male element, which is insertable in a cavity 8 in the clamping unit 3. The coupling between the cutting unit and the clamping unit may advantageously be of the type COROMANT CAPTO®, the male element 7 as well as the cavity 8 having a polygonal, although softly rounded cross-section shape at the same time as the male element tapers off in the rearward direction. In the area of the interior of the cavity 8, there is a, not shown, clamping mechanism which may be brought into engagement with coupling means (not shown) inside the male element 7 with the purpose of pulling in and fixing the male element in the cavity during installation and ejecting of the same during removal, respectively. The envelope surface on the male element 7 is designated 9, while the interior surface defining the cavity 8 is designated 10.

When the tool, in the above described way, is in the form of a cutting unit which is insertable in a clamping unit with a clamping mechanism, the system is denominated "modular tool system" by those skilled in the art. As is seen below, the invention is, however, also applicable to simpler cutting tools.

The front and rear parts 5 and 7, respectively, of the cutting unit 2 are spaced-apart by a transverse, plate-shaped part 11, on the front side of which a so-called nozzle plate 12 is applied, i.e., a detachable plate in which a plurality of nozzles 13 are mounted, which have the purpose of spraying liquid jets 4 towards the cutting insert 6. The nozzles are spaced above and rearwardly from the insert 6, so that an air gap is formed between the nozzles and the insert. In the example shown, the plate 12 includes four nozzles. Holes for screws (not shown) are indicated by reference 14, by means of which the nozzle plate may be fixed on the front side of the plate part 11.

As far as the tool shown in FIGS. 1 and 2 has been described hitherto, the tool is in all essentials the same as that known previously from the above-mentioned WO 99/39852.

Figure 3:
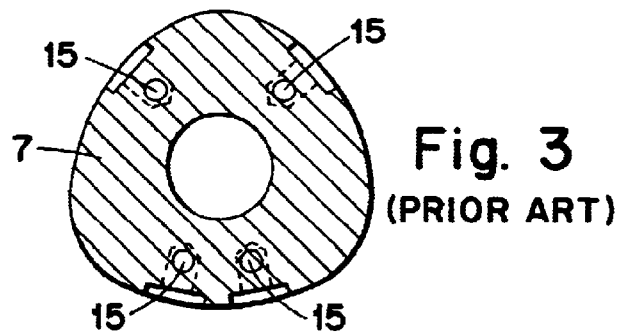
FIG. 3 is a cross-section taken along line A—A in FIG. 2.
Figure 5:
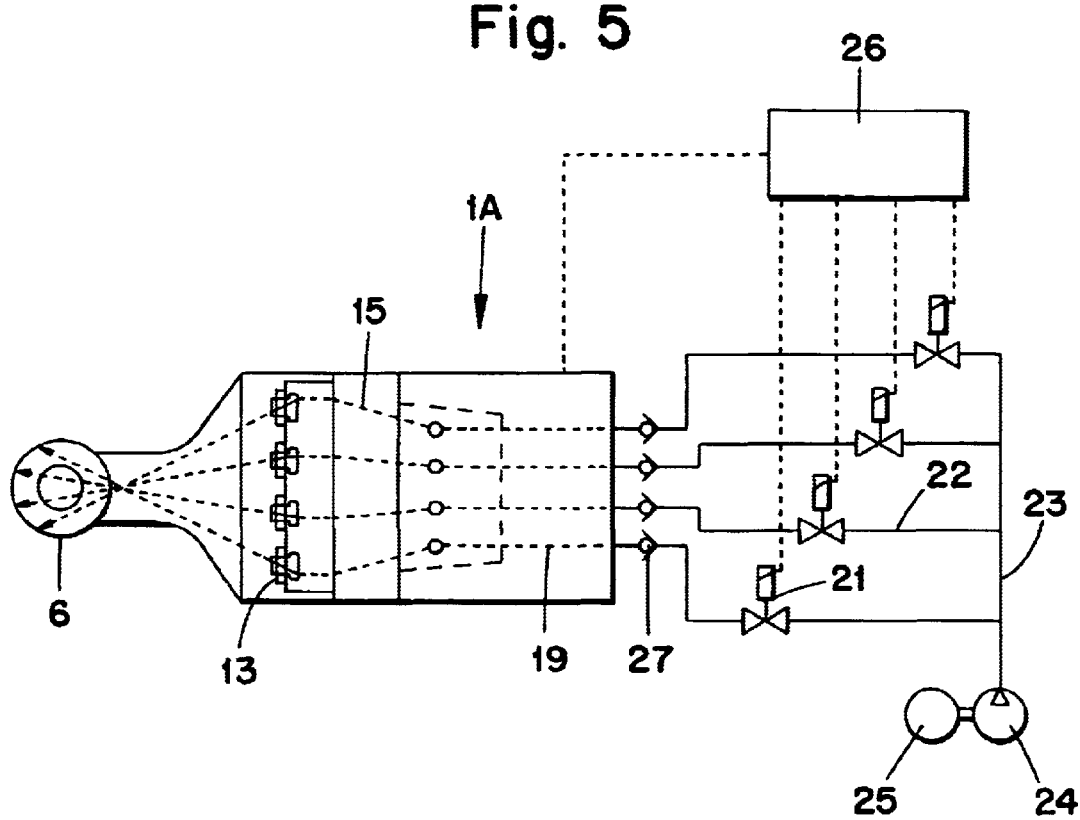
FIG. 5 is a schematic illustration showing how four nozzles included in the tool are supplied with high pressure cooling liquid from a liquid supply source included in the machine according to the invention.

Characteristic of the invention is that the duct system which is required for feeding cooling liquid to the nozzles 13 includes an equally large number of mutually spaced-apart ducts as the number of nozzles, it being possible to shut the individual ducts individually to enable spraying by only one jet at a time. Thus, in FIGS. 2 and 3 it can be seen how the cutting unit 2, which with the exception of the cutting insert 6 and the nozzle plate 12 consists of a continuous, solid metal body, includes four mutually spaced-apart ducts 15. One of the ends of each such duct vents into the front surface of the plate part 11, more precisely in a space 16 behind the nozzle 13. This port is designated 17. A second port 18 at the opposite end of the duct is located in the envelope surface 9 of the male element 7. The four ports 18 of the ducts are located at predetermined, mutually spaced-apart points along the envelope surface 9. A corresponding number of second ducts inside the clamping unit 3 co-operate with the ducts in the cutting unit 2. These second ducts, which are schematically shown in FIG. 5 and designated 19, have front ports 20, which open in the internal limiting surface 10 of the cavity 8. The location of these ports 20 corresponds to the location of the ports 18 of the first ducts 15, more precisely in such a way that the ports are located opposite each other when the male element 7 of the tool is retracted to a rear, fixed end position in the clamping unit.

According to a preferred embodiment of the invention, each one of the duct ports 18, 20 extends substantially radially in relation to the longitudinal axis of the tool. In this way, it is guaranteed that cooling liquid with very high pressure may be transferred in the radial direction from each duct 19 in the clamping unit 3 to a corresponding duct 15 in the cutting unit 2 without applying axial forces to the cutting unit, which would tend to eject the cutting unit from the clamping unit.

Each individual, continuous duct consisting of a duct 19 in the clamping unit 3 and a duct 15 in the cutting unit can be closed individually by means of a cut-off valve 21. Although it is feasible per se to locate these valves inside the clamping unit 3 (or even inside the cutting unit 2), it is preferred to locate these valves in a suitable way inside or adjacent to the machine 1. Thus, in FIG. 5 it can be seen how the valves 21 are distanced from the clamping unit 3. Said valves 21, which advantageously consist of solenoids, are arranged in branch conduits 22 to a main conduit 23, which is connected to a pump 24 and a tank for liquid 25. Furthermore the valves are electrically connected to a common control unit 26, e.g. a computer unit working with a suitable program of the type that may be used to control the tool operations of the machine in a conventional way. Each individual, arbitrary valve may hold the appurtenant branch conduit 22 open at the same time as the other valves shut the remaining branch conduits. At times, the set of cut-off valves 21 may be located at a considerable distance from the appurtenant tool, i.e. the part of each branch conduit (e.g. in the form of a hose) extending between the individual valve and the clamping unit 3 may be comparatively long. In order not to empty this branch conduit when a valve is shut, a spring-activated valve 27 is arranged in each branch conduit, which valve is opened at a predetermined, comparatively low liquid pressure. As is outlined in FIG. 5, these valves 27 are located in close proximity to the clamping unit in order to guarantee the shortest feasible way between the valves and the nozzles 13. This, in turn, guarantees that cooling liquid will be fed to the nozzle as quickly as possible when the individual solenoid valve 21 is opened.

Concerning the nozzles 13, these may per se be formed in the way which is described in WO 99/39852, i.e. be re-adjustable to enable fine adjustment of the point of impact of the liquid jet in question. In FIG. 2 is shown how this jet is effected by the fact that liquid from the space 16 passes through a fine bore 28 in the nozzle. However, it is also feasible to use fixed nozzles of a simpler type, i.e. nozzles on which the jet direction is set once and for all in connection with the manufacture of the nozzle plate. In this connection, it should be pointed out that the nozzles 13 do not necessarily have to be placed in a common horizontal plane as is shown in FIG. 1. Thus, certain nozzles, e.g. those centrally situated, may be situated on a higher level than the outer nozzles. In other words, the exact location of the nozzles along the surface of the nozzle plate is not critical. What is essential however is that the bores 28 of the nozzles are adjusted in such a way in relation to the position of the nozzles in the nozzle plate that the different jets will be directed towards different points of impact in the area of the cutting edge of the cutting insert.

The Function and Advantages of the Invention

Figure 4:
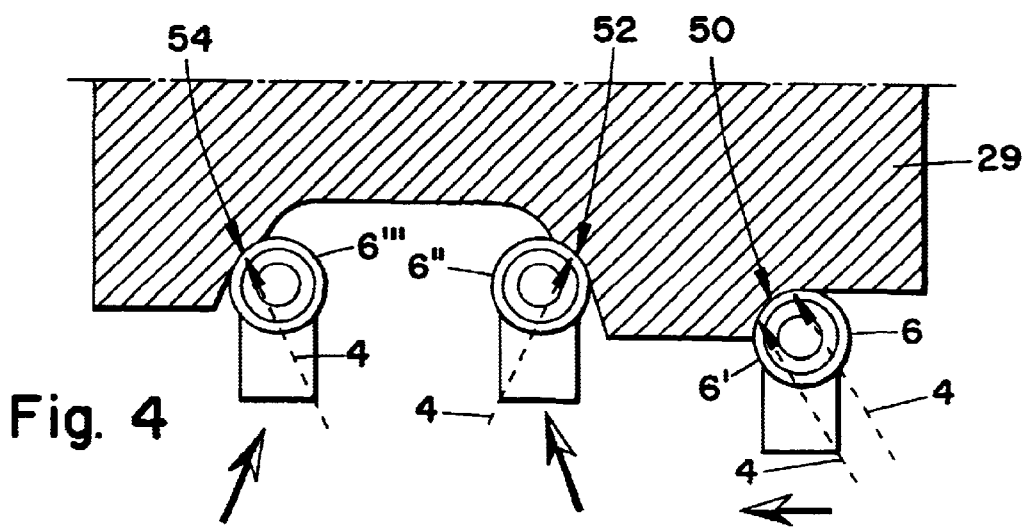
FIG. 4 is a schematic, partial longitudinal section through a workpiece during copy turning by means of a tool according to the invention.

In FIG. 4, the path of movement of the cutting insert 6 is visualised schematically during copy turning of a rotating work piece 29, e.g. a shaft or the like. To the right in FIG. 4, the cutting insert is shown during axial feed, more precisely in the direction to the left along the workpiece. Depending on the cutting depth, in this connection a comparatively long portion of the edge of the cutting insert may be in contact with and machine the workpiece. Under these circumstances, two high-pressure liquid jets 4 may be directed to advantage towards the active portion of the cutting edge. This is something which is brought about by the fact that the two (viewed from above and the behind) right hand nozzles of the tool are supplied with cooling liquid by keeping the appurtenant valves open, at the same time as the two other valves are kept closed. In a second step, the cutting insert may be fed radially during which operation only a shorter portion of the cutting edge is active, this edge portion having "migrated" along the edge, as is shown in the middle of FIG. 4. In this situation, it is sufficient to cool the cutting insert with only one liquid jet. In order for this jet to obtain the optimum angle in relation to the edge, i.e. an angle closest to 90° in relation to the tangent of the edge in the machining point, another of the four laterally spaced-apart nozzles of the tool is activated, e.g. the nozzle positioned furthest to the left (view from above/the back). In this case, the jet 4 strikes approximately at "two o'clock". To the left in FIG. 4, another situation is shown during which one single jet from a nozzle at the right strikes a limited edge portion approximately at "ten o'clock".

A major advantage of the invention is that high pressure cooling liquid jets may be directed individually towards different points of impact on one and the same cutting insert without interfering with each other, at the same time as the jet angle in relation to the active, reciprocally migrating cutting edge portion which machines a work piece becomes optimum. Due to the fact that the jets may be activated one at a time, cooling liquid consumption is furthermore reduced to a minimum because all nozzles except one or more effectively operating nozzles may be inactivated.

Figure 6:
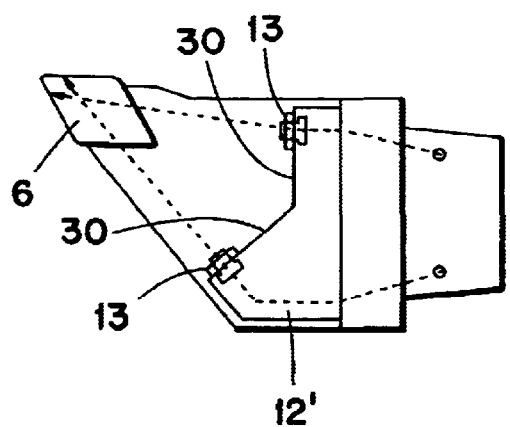
FIG. 6 is a plan view from above showing a tool according to an alternative embodiment of the present invention.

In FIG. 6 an alternative embodiment is schematically illustrated in which the cutting insert 6 has a polygonal, particularly rhomboid shape with two exposed cutting edges which extend at an acute angle in relation to each other. In this case, the tool is shown with only two nozzles 13. These are mounted in a nozzle plate 12', which is partially wedge-shaped and has a front side with two partial surfaces 30 extending at an obtuse angle to each other, each of the two nozzles being mounted in a part surface. In this way, the nozzles will spray cooling liquid jets directed at an acute angle to each other, more precisely so that the left nozzle should spray a jet towards the right edge of the cutting insert and the other way around. Although only two nozzles are shown in this embodiment, more nozzles may of course be included.

Feasible Modifications of the Invention

The invention is not limited to the examples of embodiments described above and shown in the drawings. Thus, the invention is applicable to various cutting tools, regardless of whether these are included in a modular tooling system and co-operate with a particular clamping unit, or are of a simpler type. Thus, the tool may have a simple, rear shank, which is applied in a simple, traditional holder in the appurtenant machine tool. Furthermore, the number of nozzles and the location thereof may be varied in many different ways within the scope of subsequent claims. It should also be pointed out that the shape and number of the cutting inserts are of minor importance. It is also feasible to apply the invention on tools having two or more cutting inserts. In this connection, the tools are formed with a number of nozzle sets corresponding to the number of cutting inserts, which nozzle sets separately include two or more nozzles that can be activated individually.

What is claimed is:

1. A machine for the chip cutting machining of metallic workpieces comprising:
   a holder;
   a tool body including front and rear parts, the front part carrying a cutting insert, the rear part mounted in the holder;
   a plurality of nozzles for emitting respective jets of cooling liquid, the nozzles spaced above and rearwardly of the insert, the nozzles aimed at different respective points along a cutting edge structure of the insert;
   a plurality of liquid ducts connected to respective ones of the nozzles for conducting cooling liquid thereto;
   a duct-closing mechanism for selectively opening the ducts independently of one another during a machining operation; and
   a pre-programmed controller for automatically controlling relative movement between the body and a workpiece along a predetermined path, and automatically controlling the duct-closing mechanism for independently opening different ones of the nozzles selected in correlation to a specific portion of the cutting edge structure actively engaged in cutting, to emit cooling liquid specifically toward such portion.

2. Machine according to claim 1, characterized in, that a number of valves (21), corresponding to the number of ducts, for closing and opening of said liquid ducts (15) in the cutting tool (2) are arranged in or adjacent to the machine (1) between the tool and a pump (24) which serves as a liquid supply source.

3. Machine according to claim 2, characterized in, that the valves consist of solenoid valves (21), which are controlled by one and the same control unit (26) which controls the working operations of the individual tool (2).

4. Cutting tool for machines for chip cutting machining, including a front part (5), which has at least one cutting insert (6), as well as a rear part (7), which is fixed detachably in a permanent holder (3) in a co-operating machine (I), the tool including a plurality of nozzles (13), which have the purpose of spraying jets (4) of high pressure cooling liquid towards the cutting insert (6), as well as a duct system to transport pressurized cooling liquid from a liquid supply source to said nozzles, characterized in, that said duct system includes an equally large number of mutually spaced-apart ducts (15) as the number of nozzles (13), the nozzles—at least during the operative state of the tool—being adjusted in order to direct the jets thereof towards different points of impact on one and the same cutting insert (6), and that the individual ducts (15) can be closed individually in order to enable spraying of only one jet at a time towards the appurtenant point of impact.

5. A method of performing a chip-cutting machining operation on a metallic workpiece comprising the steps of:
   A) positioning a tool body adjacent the workpiece, with a cutting insert disposed at a front end of the tool body;
   B) effecting relative movement between the workpiece and the cutting insert to cause a cutting edge structure of the insert to cut the workpiece such that a portion of the cutting edge structure that is actively cutting changes as cutting progresses;
   C) automatically conducting cooling liquid to at least one of a plurality of nozzles spaced above and rearwardly from the insert and aimed toward different respective portions of the cutting edge structure, to cause the at least one nozzle to emit a jet of cooling liquid toward a first portion of the cutting insert that is cutting; and
   D) terminating the supply of cooling liquid to the at least one nozzle, and conducting cooling liquid to at least one other of the nozzles spaced above and rearwardly of the insert during the machining operation to cause the at least one other nozzle to emit cooling liquid toward a second portion of the cutting edge structure that is cutting.

* * * * *